US006749022B1

(12) United States Patent
Fredd

(10) Patent No.: US 6,749,022 B1
(45) Date of Patent: Jun. 15, 2004

(54) FRACTURE STIMULATION PROCESS FOR CARBONATE RESERVOIRS

(75) Inventor: Christopher Fredd, Alice, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/065,441

(22) Filed: Oct. 17, 2002

(51) Int. Cl.$^7$ .............................................. E21B 43/26
(52) U.S. Cl. ..................... 166/250.1; 166/307; 166/308
(58) Field of Search ............................ 166/250.1, 307, 166/308, 271, 295; 507/241, 267, 272, 923

(56) References Cited

U.S. PATENT DOCUMENTS 6,196,318 B1    3/2001    Gong et al. .................. 166/308

OTHER PUBLICATIONS

Reservoir Stimulation–Appendix for Chapter 16 "*Advances in Understanding and Predicting Wormhole Formation*" by Christopher N. Fredd (e.g., at p. A16–4).
Reservoir Stimulation–Chapter 17 "*Carbonate Acidizing Design*" by J.A. Robert and C.W. Crowe.
Cambridge University Press, New York (1984) "*Diffusion: Mass Transfer in Fluid Systems*" by Cussler, E.L. Table 9.3–2 on p. 230–231, pp. 301–304.
SPE 50612 "*Emulsified Acid Enhances Well Production in High–Temperature Carbonate Formations*" by R.C. Navarrette, B.A. Holms, S.B. McConnell and D.E. Linton.
Reservoir Stimulation–Chapter 5 "*Basis of Hydraulic Fracturing*" by M.B.Smith and J.W. Shlyapobersky (pp. 5–25).
Reservoir Stimulation–Appendix for Chapter 5 "*Evolution of Hydraulic Fracturing Design and Evaluation*" by K.G.Notle (pp. A–15).
SPE 27403 "*The Effect of Wormholing on the Fluid Loss Coefficient in Acid Fracturing*" by A.D. Hill, Ding Zhu and Y. Wang.
Chemi. Eng. Sci., 53 (22) "*Kinetics of Calcite Dissolution in Acetic Acid Solution*" by Christopher N. Fredd and H. Scott Fogler (pp. 3863–3874).

*Primary Examiner*—John Kreck
(74) *Attorney, Agent, or Firm*—Thomas O. Mitchell; Brigitte Jeffery; John Ryberg

(57) ABSTRACT

A new process of fracture stimulating a carbonate reservoir in a subterranean formation to stimulate the production of hydrocarbon fluids from the formation is described. During the process, the composition and reactivity of the fracture stimulation fluid that is injected into the formation surrounding a wellbore is varied from a lower reactive fluid to a higher reactive fluid. The process is designed to stimulate the fracture starting from the tip of the fracture and progressing along the fracture back to the wellbore. The reactivity of the fracture stimulation fluid is increased to maintain optimum stimulation conditions for the formation of conductive flow channels along the faces of the fracture. An optimum fracture stimulation efficiency number, $F_p$, is used (generally integrated into a fracture simulator computer program) to regulate the fluid composition by reactivity and flow rate, based on formation and fluid parameters.

22 Claims, 1 Drawing Sheet

FRACTURE STIMULATION PROCESS FOR CARBONATE RESERVOIRS

BACKGROUND OF THE INVENTION

Field of the Invention

This invention relates to a new process of fracturing a carbonate reservoir in a subterranean formation to stimulate the production of hydrocarbon fluids from the formation. During the process, the composition and reactivity of the fracture stimulation fluid that is injected into the formation surrounding a wellbore is varied from a lower reactivity fluid to a higher reactivity fluid. The new process is designed to effectively stimulate the fracture starting from the tip of the fracture and progressing back to the wellbore.

Fracture stimulation, commonly referred to as fracture acidizing, or acid fracturing, when acid is the stimulation fluid, is a stimulation technique commonly used to increase the productivity of hydrocarbon fluids from subterranean formations. Fracture acidizing is used in carbonate reservoirs. The technique typically involves the injection of acid, usually aqueous hydrochloric acid (HCl), through a wellbore and into the formation at pressures sufficient to fracture the formation or open existing fractures. The acid etches the fracture faces, resulting in the formation of conductive flow paths. Frequently, the treatments are not effective. The depth of stimulation is typically limited by rapid consumption of acid near the wellbore and loss of acid through the fracture faces (commonly referred to as fluid leakoff or fluid loss). Fluid leakoff is a dynamic process that is influenced significantly by the formation of wormholes that form in the porous walls of the fracture. Wormholes are highly conductive flow channels that form approximately normal to the fracture. These wormholes divert fluid from the fracture, consume large amounts of reactant from the fracture stimulation fluid, and provide no benefit to the conductivity of the fracture. By "conductivity of the fracture" is meant the capability of formation fluids to migrate or flow through the conductive etched flow channels that are formed by the reaction of the fluid with components of the formation along the faces of the fracture. The formation fluids, of course, migrate or flow through such conductive etched flow channels to the wellbore where they are produced to the surface and recovered. The creation of such conductive etched flow channels in the formation is easily evidenced by enhanced production of formation fluids from the well, and such channels can also be visually observed in the laboratory using conventional acid conductivity tests on core samples.

Fracture stimulation fluid systems, such as emulsified HCl, have been devised which tend to provide deeper penetration of live acid. The effectiveness, defined based on the depth of live acid penetration, of such systems in fracture acidizing treatments is enhanced because the rate of dissolution and rate of wormhole propagation are decreased relative to straight HCl. However, near wellbore conductivity is typically low due to insufficient dissolution or etching of the fracture faces that, in turn, is caused by an initial cool-down effect and fracture geometry in the near wellbore vicinity. Thus, a method of increasing both the length and conductivity of the conductive etched flow channels is required to improve the effectiveness of fracture stimulation treatments.

SUMMARY OF THE INVENTION

A novel process of fracture stimulation has now been discovered to stimulate the production of hydrocarbon fluids from carbonate reservoirs in subterranean formations penetrated by a wellbore. The new process comprises injecting a fracture stimulation fluid into and through a wellbore and into the carbonate reservoir under pumping conditions that are selected and controlled to maintain an optimum fracture stimulation efficiency number, $F_f$, of about 0.1 to about 0.3 during the fracturing process. The fracture stimulation efficiency number in the present invention is selected and controlled such that the fracture is effectively stimulated starting from the tip of the fracture and progressing back along the fracture to the wellbore. The fracture stimulation fluid compositions and treatment conditions used to maintain the optimum fracture efficiency number can be conveniently regulated by varying the reactivity of the fracture stimulation fluid from a composition of low reactivity to one of higher reactivity during the process. The flow rate and/or viscosity of the fracture fluid can also be varied to control the rate of mass transfer of the reactants and products in accordance with an optimum fracture stimulation efficiency number, based on formation and fluid parameters. The new fracturing process can provide deep penetration of live reactant along the fracture, reduce the rate of wormhole formation to control fluid loss, and efficiently create highly conductive etch patterns on the fracture faces.

DETAILED DESCRIPTION OF THE INVENTION

Figure 1:
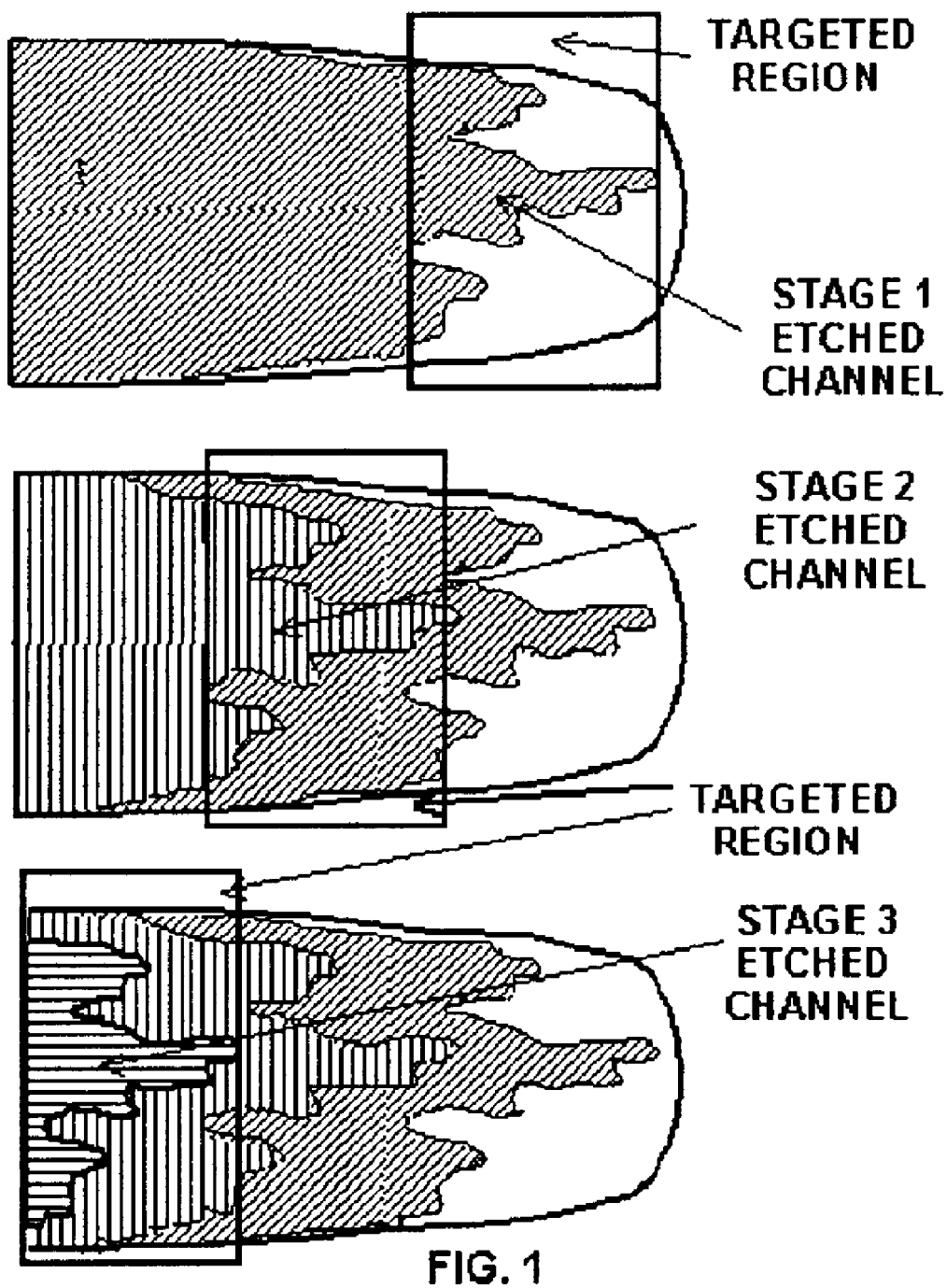
FIG. 1 illustrates the typical etching patterns obtained in targeted stimulation regions as the stimulation region changes from the near-tip of the fracture to the wellbore in a three-stage treatment.

As used herein, a "fracture stimulation fluid" is a fluid containing one or more components that chemically react to dissolve or otherwise solubilize the carbonate component of the rock in the subterranean formation. The chemically reactive components of the fracture stimulation fluid are referred to below as "reactants" and the dissolved or solubilized materials generated by contact of the fracture stimulation fluid with the carbonate-containing rock are referred to below as "products." An example of a fracture stimulation fluid useful in the present invention is one whose composition is changed during the fracture acidizing process from a sodium acetate/acetic acid mixture initially, to acetic acid, to a blend of acetic acid and hydrochloric acid, and then to hydrochloric acid; this change could be done incrementally in three stages or by continuously injecting a blend of the acids. In this example, the acids (acetic acid and hydrochloric acid) are "reactants" and the "products" obtained by contacting the fluid with a carbonate-containing rock formation would be carbon dioxide, water, and inorganic salts. The reactivity of the fracture stimulation fluid is increased during the treatment process to maintain a fracture stimulation efficiency number sufficient to optimize the creation of conductive etched flow channels in the formation. An optimum fracture stimulation efficiency number, $F_f$, is used (generally integrated into a fracture simulator computer program) to regulate the fluid composition by reactivity and flow rate, based on formation and fluid parameters. "Conductive etched flow channels" are channels that are formed by the flow and reaction of a fracture stimulation fluid along the faces of a fracture through which hydrocarbon fluids and other formation fluids can then flow from various points along the fracture to the wellbore.

The novel process typically, and preferably, starts with a conventional pad fracturing stage to generate the fracture or open an existing fracture or fractures in the carbonate-containing subterranean rock formation. Once generated, a low reactivity fracture fluid is injected to stimulate the near-tip region of the fracture. The reactivity of the stimulation fluid is then subsequently increased (incrementally or continuously) to stimulate the targeted stimulation region, which changes from the near-tip region of the fracture to the wellbore as the stimulation treatment progresses. With this approach, excessive wormhole formation and reactant consumption are minimized between the wellbore and the targeted stimulation region. The reactivity of the fluid is selected such that the rate of dissolution of the carbonate in the subterranean rock formation is sufficiently influenced by the rate of mass transfer to result in the formation of conductive etched flow channels in the targeted stimulation region of the fractured formation.

The flow rate in the targeted stimulation region increases as the treatment progresses (because it is moved closer to the wellbore) and the reactivity of the fluid is increased to maintain a fracture stimulation efficiency number sufficient to optimize the creation of conductive etched channels in the face of the formation. The reactivity of the stimulation fluid can be controlled by varying the rate of reaction, the rate of mass transfer, or both. For example, the rate of reaction can be decreased by changing the type of fracture stimulation fluid, by changing the form of the fluid from a solution to an emulsion, by adding appropriate salts (which change the equilibrium constant for the surface reaction), or by increasing the pH of the fracture stimulation fluid. The rate of reaction can also be decreased by changing the physical processing conditions (e.g., by reducing the pump flow rate and/or pumping pressure, or by cooling the fracture stimulation fluid using external cooling means or internal cooling means (e.g., pumping a large pad stage, by adding nitrogen or other gas that is inert in the process).

Another example of the present fracture stimulation treatment involves injecting a continuously changing blend of acetic acid (HAc) and hydrochloric acid (HCl) through a wellbore and into a carbonate reservoir in a subterranean formation. In this example, the two acids are simultaneously injected into the formation with the flow rates gradually changing from the total pump rate (Q) to zero and from zero to Q for HAc and HCl, respectively (that is, from straight HAc to blends of HAc/HCl to straight HCl). Examples of other suitable fracture fluid systems are listed in Table 1.

TABLE 1

| Fluid 1 (relatively low reactivity) | Fluid 2 (relatively high reactivity) |
| --- | --- |
| Acetic Acid | Hydrochloric Acid |
| Acetic Acid with Sodium Acetate | Acetic Acid |
| Acetic Acid with Sodium Acetate (high sodium acetate concentration) | Acetic Acid with Sodium Acetate (low sodium acetate concentration) |
| EDTA, pH 12 | EDTA, pH 4 |
| HEDTA, pH 12 | HEDTA, pH 4 |
| Emulsified HCl (high surfactant concentration) | Emulsified HCl (low surfactant concentration) |
| Emulsified HCl (strong surfactant) | Emulsified HCl (weak surfactant) |
| Emulsified HCl (high oil content) | Emulsified HCl (low oil content) |

As the information in Table 1 illustrates, the fluid of lower reactivity can be and preferably is in most situations an aqueous acid (such as formic acid, acetic acid, and the like), emulsified acid, or a chelating agent (e.g., an aminopolycarboxylic acid, such as N-hydroxyethyl-N, N', N'-ethylenediaminetriacetic acid ("HEDTA") or a sodium (Na), potassium (K) or ammonium ($NH_4^+$) salt thereof at a basic pH) while the fluid of higher reactivity can be and usually is an aqueous acid (such as acetic acid, hydrochloric acid), an aqueous chelating agent (e.g., HEDTA at an acidic pH), or the like. The chelating agents useful herein are a known class of materials having many members. The class of chelating agents includes, for example, aminopolycarboxylic acids and phosphonic acids and sodium, potassium and ammonium salts thereof. HEDTA and HEIDA (hydroxyethyliminodiacetic acid) are useful in the present process; the free acids and their Na, K, $NH_4^+$ salts (and Ca salts) are soluble in strong acid as well as at high pH, so they may be more readily used at any pH and in combination with any other reactive fluids (e.g., HCl). Other aminopolycarboxylic acid members, including EDTA, NTA (nitrilotriacetic acid), DTPA (diethylenetriaminepentaacetic acid), and CDTA (cyclohexylenediaminetetraacetic acid) are also suitable. At low pH these latter acids and their salts may be less soluble. Examples of suitable phosphonic acids and their salts, include ATMP: aminotri(methylenephosphonic acid); HEDP: 1-hydroxyethylidene-1,-phosphonic acid; HDTMPA: hexamethylenediaminetetra (methylenephosphonic acid); DTPMPA: diethylenediamine-pentamethylenephosphonic acid; and 2-phosphonobutane-1, 2,4-tricarboxylic acid. All these phosphonic acids are available from Solutia, Inc., St. Louis, Mo., USA, as DEQUEST (Registered Trademark of Solutia) phosphonates. Such materials are known in the oilfield. Prior art treatments did not, however, inject such fluids into the formation in such a manner as to maintain an optimum fracture stimulation efficiency number and they were not as effective as the methods of the subject invention in creating conductive etched flow channels in the formation.

The creation of conductive etched flow channels in the formation is optimized by controlling the mass transfer variables (generally, the diffusivity, viscosity and flow rate) and surface reaction variables (generally, the surface reaction rate and equilibrium constant for the surface reaction) of the stimulation fluid so as to maintain an optimum fracture stimulation efficiency number (i.e., from about 0.1 to about 0.3) during the fracturing process. That number is determined by the mathematical relationship set forth in the optimum stimulation efficiency number, $F_f$, set forth in equation (1) below.

The formation of conductive etched flow channels along the face of a fracture occurs when the rate of dissolution is influenced by the rate of mass transfer and there exist local variations in the flow rate. Variations in the flow rate may be caused by local variations in the fracture width (because of variations in mechanical properties of the rock and/or stresses in the formation) and the presence of surface asperities that form tortuous and confining flow paths. The result is local variations in the rate of dissolution, which cause differential etching and eventually the formation of conductive etched flow channels. Variations in mineralogy, which may also lead to local variations in the rate of dissolution, have historically been the primary, if not the only, reported means of obtaining sufficient differential etching during fracture acidizing. These variations contribute to differential etching if local dissolution is sufficiently influenced by the kinetics of the surface reaction for at least one of the mineral types present along the fracture faces.

The structure of the etched pattern that forms along a fracture is dependent on the rates of mass transfer and surface reaction. Hence, the structure varies with flow rate and type of fracture stimulation fluid used and the mineral system in the targeted stimulation region of the formation. At low flow rates (and/or rapid reaction rates), rapid reactant consumption results in near-wellbore dissolution. This etched pattern provides limited penetration and closes under closure stress due to low surface strength. At intermediate injection and/or reaction rates, conductive etched flow channels are formed. These channels penetrate deep along the fracture (far away from the well-bore) and result in large areas of undissolved rock that effectively support closure stresses and maintain the channels open when the fracture closes. At high flow rates (and/or low reaction rates), uniform dissolution occurs as the reactant penetrates deep along the fracture. A uniform dissolution pattern does not provide sufficient dissolution or differential etching to maintain conductivity after fracture closure. However, by varying the flow rate and/or reactivity of the fracture stimulation fluid in accordance with the present invention, conductive etched flow channels are formed along the face of the fracture and the formation of such channels is optimized by maintaining an optimum fracture stimulation efficiency number during the fracturing process. This is illustrated in FIG. 1.

The effectiveness of a stimulation fluid for providing the optimum dissolution etch pattern is given by a fracture stimulation efficiency number, $F_f$, which as used in the present fracture stimulation process is defined as:

$$F_f = Da_f + \xi_f \tag{1}$$

where $Da_f$ is the Damköhler number in the fracture and $\xi_f$ is a dimensionless fracture fluid loss term. The fracture Damköhler number, $Da_f$, is defined as:

$$Da_f = \frac{2hL\kappa}{Q} \tag{2}$$

where Q is the local flow rate in the fracture, h and L are the height and length of the fracture, respectively, and $\kappa$ is the overall dissolution rate constant. The overall dissolution rate constant depends on the sum of mass transfer and reaction resistances in series, which for a first-order surface reaction is given by the equation:

$$\kappa = \frac{1 + \frac{1}{vK_{eq}}}{\frac{1}{K_1} + \frac{1}{vk_r} + \frac{1}{vK_{eq}K_3}} \tag{3}$$

where $K_1$ and $K_3$ are the mass transfer coefficients for the reactants and products, respectively, $k_r$ is the surface reaction rate constant, $K_{eq}$ is the effective equilibrium constant of the reaction, and v is the stoichiometric ratio of reactants consumed to products produced. The values of $k_r$ and $K_{eq}$ depend on the specific fluid-mineral system and are typically a strong function of temperature. For non-first-order reactions, a pseudo-first-order surface reaction rate expression can be used as described, for example, in the Appendix to Chapter 16 entitled "Advances in Understanding and Predicting Wormhole Formation," by Christopher N. Fredd, (e.g., at page A16-4), and Chapter 17 entitled "Carbonate Acidizing Design," authored by J. A. Robert and C. W. Crowe, of the text "Reservoir Stimulation," Third Edition, Edited by Michael J. Economides and Kenneth G. Nolte, John Wiley & Sons (2000). The mass transfer coefficients ($K_1$ and $K_3$) can be determined from published correlations. An example of a mass transfer correlation for flow between parallel plates is given by:

$$K_{mt} = \frac{D_e Sh}{w} \tag{4}$$

where $D_e$ is the effective diffusivity of the reactants (for $K_1$) or products (for $K_3$), w is the fracture width, and Sh is the Sherwood number for slot flow, which can be expressed as:

$$Sh = 0.33\ Re^{0.5} Sc^{0.333} \quad Re < 1800 \tag{5a}$$

$$Sh = 0.0011\ Re^{1.15} Sc^{0.333} \quad 1800 < Re < 7000 \tag{5b}$$

$$Sh = 0.026\ Re^{0.8} Sc^{0.333} \quad Re > 7000 \tag{5c}$$

where $Re = Q\rho/h/\mu$ is the Reynolds number and $Sc = \mu/\rho/D_e$ is the Schmidt number, where $\mu$ is the fluid viscosity and $\rho$ is the fluid density. See, for example, Cussler, E. L., "Diffusion: Mass Transfer in Fluid Systems," Cambridge University Press, New York (1984); and Navarrete et al., "Emulsified Acid Enhances Well Production in High-Temperature Carbonate Formations," SPE 50612, presented at the 1998 SPE European Petroleum Conference, The Hague, The Netherlands, Oct. 20–22, 1998. The correlations in equations (5a), (5b) and (5c) are valid for laminar, transitional, and turbulent flow, respectively. These expressions do not account for convection normal to the fracture face (i.e., fluid leakoff). The mass transfer coefficients can be adjusted to include fluid leakoff using an equation such as:

$$K = \frac{v_l}{e^{(v_l/K_{mt})} - 1} \tag{6}$$

where $v_l$ is the fluid loss or leakoff velocity. By calculating $\kappa$ based on mass transfer coefficients corrected using equation (6), the effects of fluid leakoff are included in the optimum fracture stimulation efficiency number, $F_f$.

The dimensionless fracture fluid loss term ($\xi_f$) is given by:

$$\xi_f = \frac{2hLv_l}{Q}\left(1 - \frac{\kappa}{K_1}\right) \tag{7}$$

The fracture fluid loss term indicates the amount of fracture stimulation fluid lost from the fracture because of leakoff, but it does not provide an indication of how effectively reactants are consumed within the fracture. The fracture Damköhler number indicates the amount of reactants consumed on the walls of the fracture as opposed to being transported along the fracture.

The preferred fracture stimulation treatment according to the present invention begins with a conventional pad stage to generate the fracture. The pad fluid can be, and usually is, a gelled aqueous fluid, such as water or brine thickened with a viscoelastic surfactant or a water soluble or dispersible polymer such as guar, hydroxypropylguar or the like. The pad fluid can contain various additives, such as fluid loss additives, crosslinking agents, and the like. Thereafter, a fracture stimulation fluid varying in reactivity from low reactivity to high reactivity is injected through the wellbore and into the formation at a rate and pressure at least sufficient to fracture the subterranean formation or extend the fracture further into the formation. The fracture stimulation fluid can be a chelating agent such as an alkylenepolyaminepolycarboxylic acid (e.g., N,N,N',N'-ethylenediaminetetaacetic acid ("EDTA") or N-hydroxethyl-N,N',N'-ethylenediaminetriacetic acid ("HEDTA"), or a suitable salt thereof (e.g., an ammonium salt)) or a single acid or a mixture of acids or an acid with an appropriate salt, as illustrated in Table 1. The reactivity of the fracture stimulation fluid can be varied by adjusting the concentration of acid and/or salt (e.g., acid salts) or changing the pH. The acid salts influence the effective equilibrium constant for the surface reaction and an increased amount of the appropriate salt will lower the reactivity of the fluid. Similarly the lower pH fluids are more acidic and more reactive than the fluids with a higher pH. To illustrate, by the addition of acid salts (e.g., sodium acetate) to the corresponding acid (e.g., acetic acid), the user can usually lower the reactivity of the acid component of a fracture stimulation fluid. The composition of the acid fracture stimulation fluid can be varied continuously or incrementally during the fracturing treatment, at the convenience of the user. The fracture stimulation fluid may contain various additives (such as, for example, corrosion inhibitors, iron control agents, surfactants, and the like).

A spacer fluid can (optionally) be injected periodically throughout the treatment to create differential etching due to viscous fingering of the subsequently injected fluid through the spacer fluid, to provide cool down, or to reduce fluid leakoff. Viscous fingering can provide a secondary differential etching mechanism in addition to the etching pattern caused by conducting the fracturing process at the optimum fracture stimulation efficiency number, in accordance with the present process. For example, a fracture acidizing treatment according to the present invention can utilize the sequential injection of: a gelled aqueous pad of guar thickened water, acetic acid (e.g., 10%), a spacer fluid (e.g., guar thickened water), a mixture of hydrochloric acid and acetic acid, a spacer fluid (e.g., guar thickened water), and aqueous hydrochloric acid (e.g., 28%). The spacer fluid can contain various additives, such as diverting agents, buffering agents, and the like; such additives are well known in the art.

Similarly, the procedural techniques for pumping fracture stimulation fluids down a wellbore to fracture a subterranean formation are well known. The person that designs such fracturing treatments is the person of ordinary skill to whom this disclosure is directed. That person has available many useful tools to help design and implement the fracturing treatments, one of which is a computer program commonly referred to as a fracture simulation model (a.k.a., fracture models, fracture simulators, fracture placement models). Most if not all commercial service companies that provide fracturing services to the oilfield have one or more fracture simulation models that their treatment designers use. One commercial fracture simulation model that is widely used by several service companies is known as FracCADE™. This commercial computer program is a fracture design, prediction, and treatment-monitoring program that was designed by Schlumberger, Ltd. All of the various fracture simulation models use information available to the treatment designer concerning the formation to be treated and the various treatment fluids (and additives) in the calculations, and the program output is a pumping schedule that is used to pump the fracture stimulation fluids into the wellbore. The text "Reservoir Stimulation," Third Edition, Edited by Michael J. Economides and Kenneth G. Nolte, Published by John Wiley & Sons, (2000), is an excellent reference book for fracturing and other well treatments; it discusses fracture simulation models in Chapter 5 (page 5–25) and the Appendix for Chapter 5 (page A-15)). The disclosure of Chapter 5 and the Appendix to Chapter 5 state in part that:

As previously mentioned, because the ultimate goal of fracturing is to alter fluid flow in a reservoir, reservoir engineering must provide the goals for a design. In addition, reservoir variables may impact the fluid loss.

Historically, the emphasis in fracturing low-permeability reservoirs was on the productive fracture length $x_f$. For higher permeability reservoirs, the conductivity $k_{fw}$ is equally or more important, and the two are balanced by the formation permeability k. This critical balance was first discussed, more than 10 years after the introduction of fracturing, with the important concept of dimensionless fracture conductivity $C_{fD}$:

$$C_{fD}=k_{fw}/kx_f \qquad (5\text{-}5)$$

This dimensionless conductivity is the ratio of the ability of the fracture to carry flow divided by the ability of the formation to feed the fracture. In general, these two production characteristics should be in balance. In fact, for a fixed volume of proppant, maximum production is achieved for a value of $C_{fD}$ between 1 and 2.

Rock and fluid mechanics (along with fluid loss) considerations control the created fracture dimensions and geometry (i.e., fracture height $h_f$, length L and width w). These considerations all revolve around the net pressure $P_{net}$ given by Eq. 5-3:

$$P_{net}=p_f-\sigma_c \qquad (5\text{-}3)$$

However, $p_{net}$, which controls $h_f$ and L, is itself a function of $h_f$ and L, and the various physical behaviors connecting height, net pressure, width, etc., interact in many ways. This makes simple statements about the relative importance of variables difficult or impossible. However, the basic physical phenomena controlling fracture growth are understood and are well established.

The major equation for fracturing is material balance. This simply says that during pumping a certain volume is pumped into the earth, some part of that is lost to the formation during pumping, and the remainder creates fracture volume (length, width and height). It is the role of fracture models to predict how the volume is divided among these three dimensions. The volume pumped is simply $$V_i=q_i \times t_p, \qquad (5\text{--}10)$$

where $q_i$ is the total injection rate and $t_p$ is the pumping time for a treatment. Equally simple, the fracture volume created during a treatment can be idealized as $$V_f=h_f \times w \times 2L=\eta \times V_i \qquad (5\text{--}11)$$

where $h_f$ is an average, gross fracture height, w is the average fracture width, L is the fracture half-length or penetration, and $\eta$ is the fluid efficiency. Finally, the volume lost while a hydraulic fracture treatment is being pumped can be approximated by $$V_{LP} \approx 6C_L h_L \sqrt{t_p}+4h_L S_p \qquad (5\text{--}12)$$

where $C_L$ is the fluid-loss coefficient (typically from 0.0005 to 0.05 ft/min$^{1/2}$), $h_L$ is the permeable or fluid-loss height, and $S_p$ is the spurt loss (typically from 0 to 50 gal/100 ft$^2$). Because material balance must be conserved, $V_i$ must equal $V_{LP}$ plus $V_f$, and Eqs. 5–10 through 5-12 can be rearranged to yield $$L \approx q_i t_p/6C_L h_L \sqrt{t_p}+4h_L S_p+2wh_f \qquad (5\text{--}13)$$

showing a general relation between several important fracture variables and design goals.

Equation 5–13 demonstrates that fracture height $h_f$ and fluid-loss height $h_L$ are important parameters for fracture design. Loss height is controlled by in-situ variations of porosity and permeability. Fracture height is controlled by the in-situ stresses, in particular by differences in the magnitude or level of stress between various geologic layers. More formally, height is controlled by the ratio of net pressure to stress differences $\Delta\sigma$, where $\Delta\sigma$ is the difference between stress in the boundary shales and stress in the pay zone. Ignoring any pressure drop caused by vertical fluid flow, the relation among fracture height, initial fracture height, $p_{net}$ and $\Delta\sigma$ can be calculated.

Consider a slit in an infinite elastic medium (i.e., the earth). Also consider that the slit is held closed by a fracture closure stress but is being opened by an internal pressure equal to the closure stress plus a net pressure $p_{net}$. Under these conditions, the slit opens into an elliptical shape, with a maximum width $$W_{max} = 2p_{net}d/E' \qquad (5\text{-}14)$$

where $E'$ is the plane strain modulus ($E' = E/(1-v^2)$, v is Poisson's ratio and typically equals about 0.2), and d is the least dimension of the fracture. For a confined-height fracture with a tip-to-tip length greater than $h_f$, equals $h_f$. This shows a direct relation between net pressure and width and introduces an important material property, the plane strain modulus. However, because typically $v^2 < 0.1$, the plane strain modulus seldom differs from Young's modulus E by a significant amount.

Typical design procedures of the invention for varying the fracture fluid reactivity (and fixed injection rate) are as follows:

1. Obtain the required formation and fracture parameters, including the surface injection flow rate required for fracturing, $Q_o$, the fracture geometry (w, H, and L), the reservoir temperature, and any additional parameters that are required by a fracture simulator such as FracCADE. (w, H, and L are calculated by the simulator.)
2. Select the desired distance from the wellbore for fracture stimulation (must be less than or equal to the initial fracture length). This value will represent the location of the initial targeted stimulation region.
3. Calculate the local leakoff velocity ($v_l$), taking into account the current depth of wormhole penetration (e.g., use the wormhole fluid-loss coefficient introduced by Hill et al., "The Effect of Wormholing on the Fluid-Loss Coefficient in Acid Fracturing," SPE Production Engineering, pages 257–263, November 1995).
4. Calculate the flow rate as a function of position along the length of the fracture (Q) based on the surface injection rate and the leakoff velocity.
5. Back-calculate the current optimum overall dissolution rate constant ($\kappa$) from the flow rate in the targeted stimulation region (determined in step 4), the fracture stimulation efficiency number, $F_f$, defined in equation (1), the optimum fracture stimulation efficiency number of about 0.1 to about 0.3, and generally about 0.2, and the current fracture geometry. This represent the fluid properties required to achieve the optimum fracture stimulation efficiency number in the targeted stimulation region.
6. Select a stimulation fluid with the appropriate properties (i.e., $\mu$, $\rho$, $D_e$, $D_{pe}$, $k_r$, and $K_{eq}$) such that the current overall dissolution rate constant calculated in step 5 can be obtained in the fracture. The appropriate fluid properties may be obtained by combining various fluid types or by adding materials (such as chemical retarders, emulsifying agents, salts, etc.) to the fluid system. If the overall dissolution rate constant ($\kappa$) for the selected fluid is too high, changes in reactivity may be achieved by adding specific salts, changing the fluid pH, changing the type of stimulation fluid, or the like.
7. Calculate the amount of dissolution (etched width) and the local depth of wormhole penetration for the stimulation fluid selected in step 6.
8. Update the fracture geometry. Note: FracCADE and the other current commercial fracture simulation models will do this step 8 automatically, albeit in a simplified manner that does not include the effects of differential etching.
9. Repeat steps 3 through 8 until the tip of the current targeted stimulation region has the desired etched width.
10. Move the targeted stimulation region towards the wellbore, such that all regions beyond the targeted stimulation region have been adequately stimulated.
11. Repeat steps 3 through 10 until the entire length of the fracture has been fracture stimulated.

The output of this design procedure defines the optimum fluid properties for any particular time during the fracture stimulation treatment. Analogous design procedures can be used when the injection rate is varied during the treatment to maintain the optimum fracture stimulation number, $F_f$, of from about 0.1 to about 0.3, and preferably about 0.2. This process could involve fixing the fracture stimulation fluid properties and adjusting the injection rate, Q, in steps 5 and 6.

Although the methods have been described here for, and are most typically used for, hydrocarbon production, they may also be used in injection wells and for production of other fluids, such as water or brine.

EXAMPLES OF THE INVENTION

Example 1. A fracture acidizing treatment with variable reaction kinetics was simulated for a limestone formation at 200° F. (93° C.). The simulation model assumed a well depth of 13,000 feet (3,962 meters). The simulation model calculated a fracture length of 800 feet (244 meters); a fracture height of 50 feet (15.24 meters); and a fracture width at the wellbore of 0.2 inch (5.08 millimeters). The stimulation fluid was 10% aqueous acetic acid (HAc) injected at 30 barrels per minute (4.77 kiloliters/minute), and the fluid reactivity was controlled by varying the concentration of sodium acetate (NaAc) in the fracture stimulation fluid. Increasing the concentration of NaAc causes a decrease in the overall rate of dissolution (C. N. Fredd and H. S. Fogler, "The Kinetics of Calcite Dissolution in Acetic Acid Solutions," Chem. Eng. Sci., 53 (22), pages 3863–3874 (October 1998)). To maintain the optimum fracture stimulation efficiency number of 0.2, the required overall dissolution rate constant, $\kappa$, for a tip-to-wellbore treatment varied from an initial value of 1.E-0.3 to 6.E-03 over a seven (7) stage treatment wherein the concentration of sodium acetate (NaAc) in 10% aqueous acetic acid (HAc) decreased (and the reactivity of the fluid increased) as the treatment progressed from stage 1 through stage 7. The required reactivity increases by about an order of magnitude over the 7-stage course of the treatment. The variable kinetics treatment creates conductive etched flow channels (at the optimum fracture stimulation number, 0.2) that penetrate about 300 feet (91.44 meters). In contrast, it was calculated, using similar assumed values, that a conventional treatment with emulsified hydrochloric acid would effectively penetrate to only about half that depth, and that a similar fracture acidizing treatment with either 15% or 28% HCl would not create conductive etched flow channels in the formation but would tend to dissolve the formation and penetrate only about 75 feet (22.86 meters) into the formation.

What is claimed is:

1. A fracturing process to stimulate the production of hydrocarbon fluids from a carbonate reservoir in a subterranean formation which comprises injecting a fracture stimulation fluid into and through a wellbore into the carbonate reservoir containing hydrocarbon fluids under pumping conditions that are selected using a simulation model and controlled to maintain an optimum fracture efficiency number, $F_p$, of about 0.1 to about 0.3 during the fracturing process.

2. The process defined by claim 1 wherein the optimum fracture efficiency number, $F_p$, is maintained at about 0.2.

3. The process defined by claim 1 wherein the fracture stimulation fluid is varied from a lower reactive fluid to a higher reactive fluid.

4. The process defined by claim 3 wherein the fracture stimulation fluid is an aqueous fluid that comprises acetic acid and/or hydrochloric acid.

5. The process defined by claim 4 wherein the composition of the fracture stimulation fluid changes during the course of the process from a sodium acetate/acetic acid mixture initially, to acetic acid, to a blend of acetic acid and hydrochloric acid, and then to hydrochloric acid.

6. The process defined by claim 3 wherein the composition of the fracture stimulation fluid comprises an aminopolycarboxylic acid or phosphonic acid chelant, or a salt thereof, as at least one of the reactive components of the fracture stimulation fluid.

7. The process defined by claim 6 wherein the pH of the fluid transitions during the course of the process from a basic pH to an acidic pH.

8. The process defined by claim 6 wherein said basic pH is about 12 and wherein said acidic pH is about 4.

9. The process defined by claim 7 wherein said aminopolycarboxylic acid is N-hydroxyethyl-N,N',N'-ethylenediaminetriacetic acid or hydroxyethyliminodiacetic acid, or a salt thereof.

10. The fracturing process defined by claim 9 wherein a low reactivity fracture stimulation fluid is injected following the aqueous pad fluid, and thereafter the reactivity of the fracture stimulation fluid is increased incrementally to stimulate the targeted stimulation region of the carbonate-containing rock subterranean formation.

11. The fracturing process defined by claim 9 wherein a low reactivity fracture stimulation fluid is injected following the aqueous pad fluid, and thereafter the reactivity of the fracture stimulation fluid is increased continuously to stimulate the targeted stimulation region of the carbonate-containing rock subterranean formation.

12. The process defined by claim 3 wherein the fracture stimulation fluid comprises an emulsified hydrochloric acid, and wherein said emulsified acid contains a surfactant in an amount that varies incrementally during the process from a high surfactant concentration to a low surfactant concentration.

13. The fracturing process defined by claim 12 wherein the flow rate of the injected fracture stimulation fluid into the formation is decreased incrementally as the process progresses.

14. The fracturing process defined by claim 12 wherein the flow rate of the injected fracture stimulation fluid into the formation is decreased continuously as the process progresses.

15. The process defined by claim 3 wherein the fracture stimulation fluid comprises an emulsified hydrochloric acid, and wherein said emulsified acid contains a surfactant in an amount that varies continuously during the process from a high surfactant concentration to a low surfactant concentration.

16. The fracturing process defined by claim 15 wherein the flow rate of the injected fracture stimulation fluid into the formation is decreased incrementally as the process progresses.

17. The fracturing process defined by claim 15 wherein the flow rate of the injected fracture stimulation fluid into the formation is decreased continuously as the process progresses.

18. A The process defined by claim 3 wherein the reactivity of the fracture stimulation fluid is increased to maintain mass transfer limitations sufficient to optimize the creation of conductive flow channels in the carbonate-bearing subterranean rock formation.

19. The process defined by claim 3 wherein the reactivity of the fluid is selected such that the rate of dissolution of the carbonate in the subterranean rock formation is sufficiently influenced by the rate of mass transfer to result in the formation of conductive etched flow channels in the targeted stimulation region of the fractured formation.

20. In a fracture acidizing process to stimulate the flow and production of hydrocarbon fluids from a carbonate reservoir in a subterranean formation, the improvement which comprises injecting a fracture acidizing fluid into and through a wellbore into the carbonate reservoir containing hydrocarbon fluids under pumping conditions that are selected using a simulation model and controlled to maintain an optimum fracture efficiency number, $F_p$, of about 0.1 to about 0.3 during the fracturing process.

21. The fracture acidizing process defined by claim 20, wherein the pumping conditions are selected using a simulation model and controlled to maintain an optimum fracture efficiency number, $F_p$, of about 0.2 during the fracturing process.

22. A fracturing process to stimulate the production of hydrocarbon fluids from a carbonate reservoir in a subterranean formation which comprises the steps of (a) injecting an aqueous pad fluid into and through a wellbore into a carbonate reservoir containing hydrocarbon fluids under pumping conditions sufficient to create a fracture in the formation or extend an already existing fracture, and (b) injecting a fracture stimulation fluid into and through a wellbore into said carbonate reservoir under pumping conditions that are selected using a simulation model and controlled to maintain an optimum fracture efficiency number, $F_p$, of about 0.1 to about 0.3 during the fracturing process.

* * * * *